Figure 1:
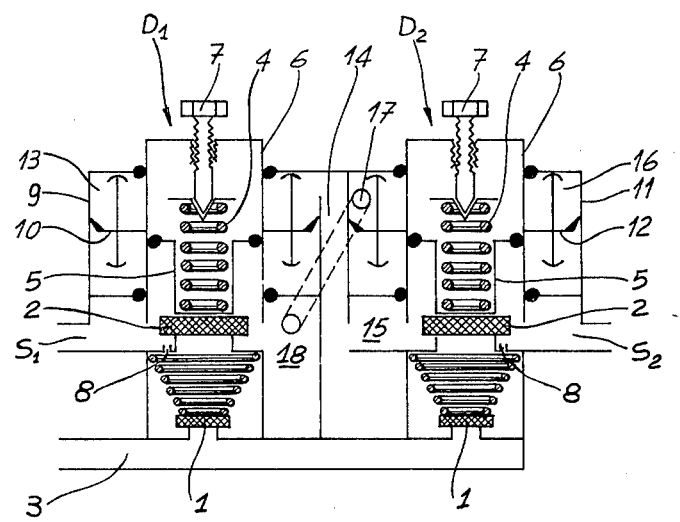

United States Patent [19]

Fantozzi

[11] 4,221,232
[45] Sep. 9, 1980

[54] SHUT OFF VALVE UNITS OF DAMAGED SECTIONS IN PNEUMATIC MULTI-SECTION BRAKING SYSTEMS OF VEHICLES

[75] Inventor: Enzo Fantozzi, Sesto San Giovanni, Italy

[73] Assignee: Fabbrica Italiana Magneti Marelli S.p.A., Milan, Italy

[21] Appl. No.: 876,751

[22] Filed: Feb. 10, 1978

[30] Foreign Application Priority Data

Feb. 11, 1977 [IT] Italy ................. 20202 A/77

[51] Int. Cl.² .......................................... B60T 17/22
[52] U.S. Cl. .................................. 137/118; 303/6 C; 303/84 A
[58] Field of Search .............. 303/6 C, 84 A; 137/118

[56] References Cited

U.S. PATENT DOCUMENTS

| | | | |
|---|---|---|---|
| 2,861,845 | 11/1958 | Keehn | 303/84 A |
| 3,010,469 | 11/1961 | Leighton | 137/118 |
| 3,037,524 | 6/1962 | Rast et al. | 303/84 A |
| 3,370,602 | 2/1968 | Nelson | 137/118 |
| 3,677,611 | 7/1972 | Vriend | 303/84 A |
| 3,753,601 | 8/1973 | Hensley | 303/84 A |
| 3,769,997 | 11/1973 | Hardwick et al. | 303/6 C |
| 4,019,526 | 4/1977 | Zoppi | 303/84 R |
| 4,037,617 | 7/1977 | Perales | 137/118 |
| 4,114,145 | 9/1978 | Farr | 303/6 C |

FOREIGN PATENT DOCUMENTS 932778 11/1972 Italy .
1025727 8/1978 Italy .
1398436 6/1975 United Kingdom .

Primary Examiner—William R. Cline
Assistant Examiner—H. Jay Spiegel
Attorney, Agent, or Firm—Ostrolenk, Faber, Gerb & Soffen

[57] ABSTRACT

Shut-off valve unit for damaged section in multi-sectioned pneumatic braking system for vehicles: each section has a shut-off valve that is spring loaded to close; each valve has an associated pneumatic device for loading the spring of the shut-off valve as a function of the pressure downstream of the shut-off valve; the pneumatic device including a shiftable piston under the control of the pressure associated with the other device for the other section of the braking system, such that shifting of the pneumatic device to its position as caused by elevated pressure in the other section increases the load on the associated spring of the shut-off valve of the respective section.

4 Claims, 4 Drawing Figures

U.S. Patent  Sep. 9, 1980  Sheet 2 of 2  4,221,232

SHUT OFF VALVE UNITS OF DAMAGED SECTIONS IN PNEUMATIC MULTI-SECTION BRAKING SYSTEMS OF VEHICLES

This invention relates to an improvement in shut off valve units of damaged sections in pneumatic multi-section braking systems of vehicles.

Shut off units of the aforesaid type are known and ordinarily consist of as many shut off valve devices as the sections of the system, each of which comprising a check valve and a shut off valve subjected to the action of a spring which is preloaded through a piston sliding within a cylinder, with said spring bearing on the bottom of the latter. The shut off valve may also operate as a check valve and is effective in case of failure in the corresponding section, by cutting off the supply to the section up to the calibration value, to allow supply of the undamaged sections.

However, the prior art valve means suffer from disadvantages as to calibration of the shut off valve and spring preloading as well.

Should the spring load be very low and accordingly the pressure for opening the shut off valve, then the loading of the section reservoirs would rapidly occur. However, in case of failure in the section, air leaks occur through the damaged section due to the re-opening at low pressure of the shut off valve.

On the other hand, the spring cannot have a high load when desiring to avoid that, in addition to reservoir supply delay, the compressor pressure peaks produce no-load running of the compressor due to operation of pressure regulator normally inserted upstream of the shut off valves.

Moreover, a high load of the spring, by acting on the rubber valve will cause permanent deformations in the rubber, particularly when the valve means are stored for an extended period of time.

It is the object of the present invention to remove the above mentioned disadvantages.

This is achieved by a shut off unit, in which at least two valve means are each provided with a pneumatic device capable of loading the spring of the shut off valve of the relevant valve means as a function of the pressure downstream of the shut off valve of the other valve means.

Thus, when the reservoirs of the two associated valve means are depleted, calibration of the valves is low, and thus the advantage is obtained of avoiding high loads on the rubber and allowing to initiate reservoir loading from any desired low pressure. On the other hand, when the reservoirs are loaded, calibration is high and can be enhanced to regulator triggering limit, allowing in case of failure re-loading of the undamaged sections to maximum pressure.

According to a preferred embodiment of the invention, each pneumatic device comprises a cylinder-piston unit, wherein the piston movements, on control of the pressure downstream of the valve of the associated valve means, are transmitted to the spring of the shut off valve, so that the load of the latter at piston rest or inoperative position, that is when control pressure is zero, is of a negligible value, whereas at position of end of stroke, that is to say at maximum control pressure, it corresponds to load value (maximum preload).

In a simple embodiment, the piston of the pneumatic device has a hollow central body, the piston of the valve means sliding therein, through which the spring acts upon the shut off valve, so that the supply chamber for the piston of the pneumatic device is defined by the zone or area about the hollow central body.

Figure 2:
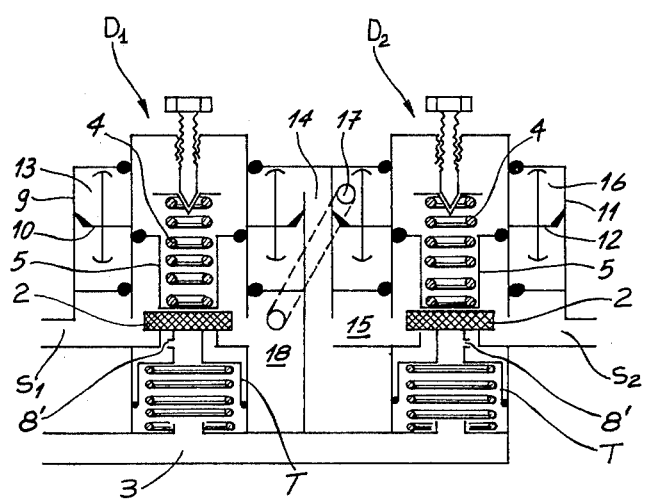
Figure 3:
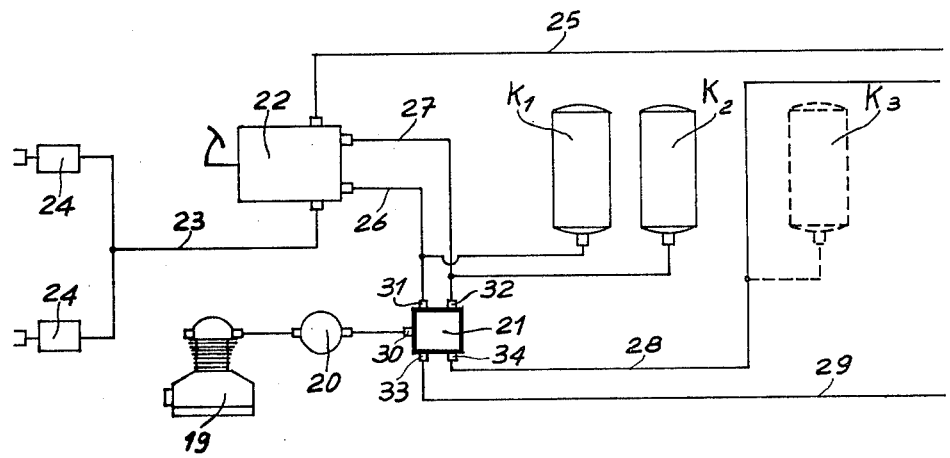
Figure 4:
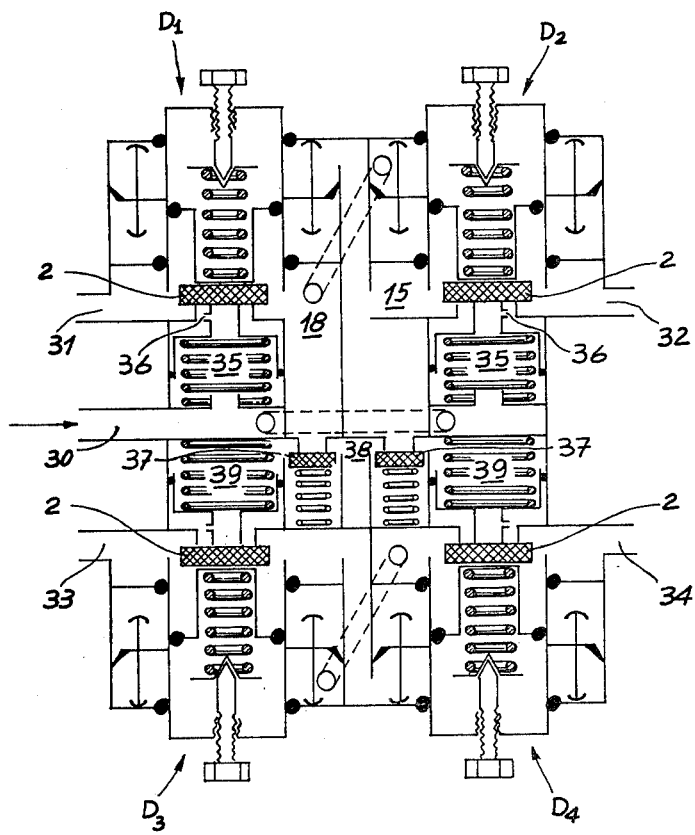

The invention will now be described in further detail with reference to the accompanying drawings, in which:

FIG. 1 shows a shut off unit comprising two valve means according to the invention;

FIG. 2 still shows a shut off unit with two valve means, but with a double seat shut off valve, according to the invention;

FIG. 3 is a view showing the diagram for the pneumatic braking system of a vehicle provided with a shut unit according to the invention; and FIG. 4 is a schematic view of the shut off unit shown in FIG. 3, and comprising two pairs of valve means.

Referring to FIG. 1, a shut off unit comprises two shut off valve means $D_1$ and $D_2$ identical to each other and each comprising a check valve 1 and a shut off valve 2, through which the pressure air arrives from supply conduit 3 at the respective sections $S_1$ and $S_2$ including the reservoirs and users (not shown).

Each of shut off valves 2 are subjected to the action of a spring 4 through a piston 5 sliding within a cylinder 6, on the bottom of the latter engaging an adjusting screw 7 for spring 4. Check valve 1 may be omitted, in which case said shut off valve 2 also performs the functions of a check valve.

Each device or means also has a calibrated passage 8 parallel to shut off valve 2, allowing initial supply of sections $S_1$ and $S_2$.

Such devices are per se known and for further details reference should be had to the Italian Pat. No. 932,778, also in the name of the present applicant.

According to the invention, each of valve means $D_1$ and $D_2$ comprise a cylinder-piston unit 9, 10 and 11, 12, respectively controlled by the pressure downstream of the shut off valve of the other valve means.

More particularly, the supply chamber 13 for piston 10 of device $D_1$ is supplied through conduit 14 by chamber 15 of device $D_2$, and similarly supply chamber 16 for piston 12 of device $D_2$ is supplied through conduit 17 by chamber 18 of device $D_1$. The pressure downstream of the respective shut off valve is also present in said chambers 15 and 18.

Each piston 10, 12 has a central body 6 defining with the respective cylinder 9, 11 a supply chamber 13, 16. Body 6 is hollow and also constitutes the cylinder having piston 5 sliding therein, through which spring 4 acts upon said shut off valve 2.

From the foregoing it will be appreciated that cylinder-piston unit 9, 10 and 11, 12 constitutes a pneumatic device for controlling the load of the spring of the shut off valve. Thus, when the pressure in chambers 15 and 18 is zero, pistons 10 and 12 are at rest or inoperative position (see FIG. 1) and the load of spring 4 on shut off valve 2 is negligible, whereas when in said chambers the pressure is at a maximum value, the pistons are moved to position of end of stroke and the spring load corresponds to the maximum value.

Since the spring load increases as a function of the pressure, the advantage is gained that in occurrence of no pressures or low pressures in chambers 15 and 18 and accordingly in the reservoirs connected to sections $S_1$ and $S_2$, loads on the valves are negligible and reservoir loading can be initiated from a low supply pressure as desired.

On the other hand, when in chambers 15 and 18 and in the reservoirs the pressure is high, loads on the valves are correspondingly high and, in case of failure in a section, the valve for the damaged section remains certainly at closed condition, with the advantage of reloading to maximum pressure the other undamaged sections. For example, in case of failure in section connected at $S_1$, the pressure in chamber 18 and hence in 16 will drop down and finally reach a value zero.

Valve 2 of device $D_1$, controlling the damaged section, closes as urged by spring 4 due to pressure in chamber 13 connected to still pressurized chamber 15. On the other hand, valve 2 of the other device $D_2$ remains at open condition, since in chamber 16 connected to chamber 18 the pressure is zero. Thus, piston 12 remains at rest or inoperative position and spring load on the valve is of low or reduced value, particularly lower than the pneumatic force acting on the valve. Thus, the section connected at $S_2$ can be supplied to a pressure value approaching the maximum value depending on the load of spring 4 for said device $D_2$. This allows to remove the disadvantage in prior art devices of having to restrict the maximum attainable pressure in the undamaged sections to the maximum calibrating value of the damaged section.

The shut off unit of FIG. 2 comprises the same valve means $D_1$ and $D_2$ of FIG. 1, but with the difference of the omission of the check valves and shut off valves 2 being of a double seat type, of which one seat is stationary and the other movable as presented by a piston T, in which a calibrated passage 8' is formed for a similar function as passage 8 of FIG. 1. For further details about double-seat valve means, refer to the Italian Patent Application No. 29469 A/74, filed on Nov. 15, 1974, now Italian Pat. No. 1,025,727 also in the name of the present applicant.

A specific application of the shut off unit according to the invention will now be described with reference to FIGS. 3 and 4.

In the pneumatic system of FIG. 3, reference numeral 19 designates an air compressor, 20 a regulator, 21 the shut off valve unit, and 22 a distributor controlling through conduit 23 the front braking elements 24 of the vehicle and through conduit 25 the rear braking elements of the vehicle (not shown).

Reference characters $K_1$, $K_2$ and $K_3$ designate the reservoirs of compressed air. Reservoir $K_1$, conduits 23 and 26 and braking elements 24 constitute the braking section for the front axle. Reservoir $K_2$ and conduits 25 and 27 along with the relevant braking elements (not shown) constitute the braking section for the rear axle or axles.

The said two sections are considered as main or independent sections.

Conduit 20 with or without reservoir $K_3$ constitutes a third section of the system, which may be used for trailer braking.

Conduit 29 and relevant users (not shown) constitute a fourth section of the system, which may be used for controlling the pneumomechanical brakes (spring brakes).

Said third and fourth sections are considered as slave or dependent sections.

The shut off unit 21 is connected through connector to regulator 20 and through connectors 31, 32, 33 and 34 to the aforesaid four sections.

In the embodiment shown in FIG. 4, such a unit, also forming the subject of the present invention, comprises four shut off devices, provided according to the approach of FIG. 2, of which the first two devices $D_1$ and $D_2$ for controlling the main or independent sections, and the other two devices $D_3$ and $D_4$, derived from the first two devices, for controlling the two slave or dependent sections.

During operation, compressed air from regulator 20 arrives through connector 30 at chambers 35 of devices $D_1$ and $D_2$, and therefrom at chambers 18 and 15 through valve 2.

Through connectors 31 and 32, air arrives from chambers 18 and 15 at the respective main sections, and through check valves 37 at chambers 38 and 39, and then through valve 2 at connectors 33 and 34 for control of the slave sections.

The behaviour of devices $D_1$, $D_2$, $D_3$ and $D_4$ is again the same as that of the devices of FIGS. 1 and 2.

What is claimed is:

1. Shut off unit for a damaged section of a multi-section pneumatic braking system for a vehicle, comprising:
   a common pressure supply conduit;
   at least two valve means supplied by said supply conduit; each said valve means comprising:
   a section conduit leading away from said valve means at the other side of said valve means from said supply conduit;
   a shut off valve element shiftable between positions for blocking and opening communication between said supply conduit and said section conduit; a spring for normally biasing said valve element to said blocking position;
   a pneumatic pressure device for selectively loading said spring dependent upon and corresponding to the pneumatic pressure in said pneumatic pressure device; said pneumatic pressure device comprising:
   a cylinder in the form of an annular shell;
   a piston including a cylindrical body; said spring being inside of and connected with said cylindrical body;
   an annular chamber in said cylinder that is defined by said cylinder annular shell; said cylindrical body of said piston being surrounded by said chamber and being sealed with respect to said chamber, and a portion of said piston being located in and also defining said chamber; said chamber being in communication with said section conduit of the other said valve means, whereby the pressure in said chamber is dependent upon the pressure in said section conduit of the other said valve means; said piston being movable with respect to said cylinder so that as pressure in said chamber of one said valve means becomes greater, said piston thereof is shifted to increase the load upon the respective said spring.

2. The shut off unit of claim 1, further comprising a leakage path between said common pressure conduit and said section conduit.

3. The shut off unit of either of claims 1 or 2, further comprising check valve means between said supply conduit and said valve element.

4. Shut off unit for a damaged section of a multisection pneumatic braking system for a vehicle, comprising:
   a common pressure supply conduit;
   at least two first valve means supplied by said supply conduit; each said first valve means comprising;

a first section conduit leading away from said first valve means at the other side of said first valve means from said supply conduit;

a first shut off valve element shiftable between positions for blocking and opening communication between said supply conduit and said first section conduit; a first spring for normally biasing said first valve element to said blocking position;

a first pneumatic cylinder and a first piston in said first cylinder: a first chamber that is defined by said piston in said cylinder and that is in communication with said first section conduit of the other first said valve means; said first piston being shiftable with respect to said first cylinder, changing the volume of said first chamber; said first piston being connected to the respective said first spring for altering the load thereof, and as pressure in said first chamber of one said first valve means becomes greater, said first piston thereof is shifted to increase the load upon said first spring;

at least two second valve means; a respective second supply conduit to each of said second valve means; each said second supply conduit being respectively connected with and being supplied by the said first chamber of a respective said first valve means; each said second valve means comprising;

a second section conduit leading away from second valve means at the other side of said second valve means from the respective said second supply conduit;

a second shut off valve element shiftable between positions for blocking and opening communication between the respective said second supply conduit and said second section conduit; a second spring for normally biasing said second valve element to said blocking position thereof;

a second pneumatic cylinder and a second piston in said second cylinder; a second chamber that is defined by said second piston in said second cylinder and that is in communication with said second section conduit of the other said second valve means; said second piston being shiftable with respect to said second cylinder, changing the volume of said second chamber; said second piston being connected to the respective said second spring for altering the load thereof, and as pressure in said second chamber of one said second valve means becomes greater, said second piston thereof is shifted to increase the load upon said second spring.

* * * * *